Patented Nov. 1, 1938

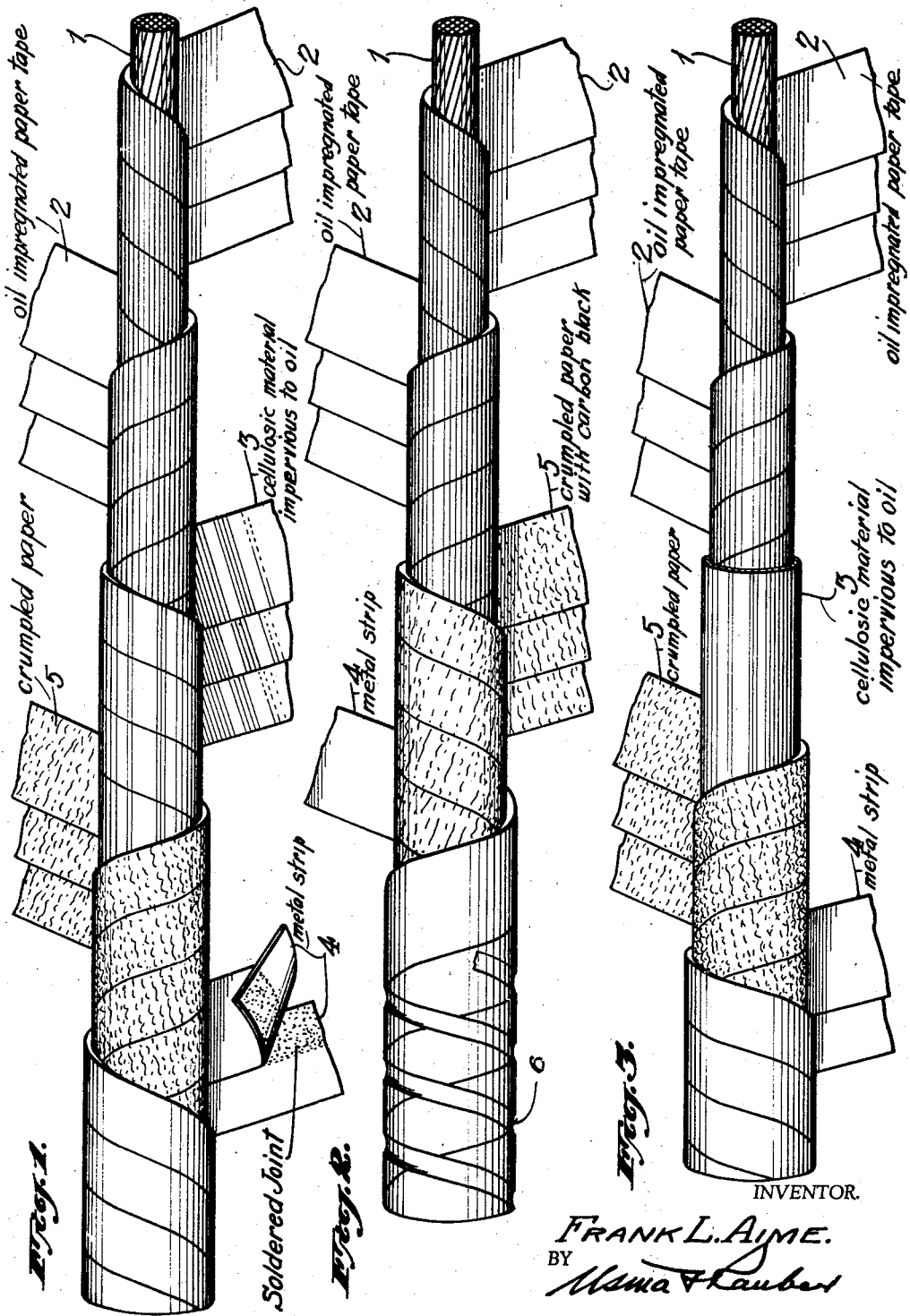

2,134,771

UNITED STATES PATENT OFFICE 2,134,771

ELECTRIC CABLE

Frank L. Aime, New York, N. Y., assignor to Anaconda Wire & Cable Company, New York, N. Y., a corporation of Delaware Application February 14, 1936, Serial No. 63,832

1 Claim. (Cl. 173—266)

This invention relates to electric cables which are protected with a metallic sheath, and more particularly to those types of cables in which the sheath is formed of overlapping strips, soldered together on their overlapping faces to form an impervious structure. This application is a continuation in part of my prior application Serial No. 710,050 filed February 7, 1934.

Heretofore cables in which the insulating medium has been varnished cambric or oil-impregnated paper have generally been protected with a sheathing of lead, extruded about the outer insulating layers. While this method of construction is generally known and widely used it has certain inherent disadvantages, especially when applied to small cables such as those designed for rural electrification projects. Chief among these disadvantages are the cost of an adequate lead sheath both because of the material itself and method of application, the fact that lead is extremely soft, being readily damaged by careless workmen during installation and handling, and finally the fact that lead is a relatively poor conductor of electricity, a serious consideration when it is desired to employ the outer sheath as a return conductor as is frequently desired on rural projects.

It is, therefore, highly desirable to develop an outer sheath for electric cables, particularly those of small diameter which possesses the necessary characteristics of durability and strength, conductivity and ease of fabrication.

In the past numerous attempts have been made to apply a metallic sheath by drawing a nonferrous tube down onto the exterior of the cable. Disregarding all other practical considerations the length of a cable produced in this manner is necessarily limited by the lengths in which suitable tubes can be obtained, a matter at the present time of forty or fifty feet. It is necessary of course to furnish cables for the above purposes in unbroken sections which may be a mile or more in length.

One form of sheath which meets all the requirements mentioned above and can also be manufactured in lengths of indefinite extent may be prepared by wrapping overlapping strips of copper about the insulated conductor and then soldering the overlapping strips together throughout their length  In carrying out this method, however, it has always been found that, under the heat and pressure necessary for soldering a considerable amount of the composition with which the paper or varnished cambric is impregnated will be forced into the spaces between the overlapping tapes and prevent a satisfactory union. One object of this invention is to eliminate this particular difficulty in the forming of such cables.

Another object of this invention is to provide means to prevent the composition of the insulating wrappings from interfering with the forming of an impervious copper sheath about the cable by soldering overlapping strips together. Another object is to provide an improved electric cable. Other objects and advantages will be apparent as the invention is more fully disclosed.

Before further disclosing the present invention reference should be made to the accompanying drawing in which:

Fig. 1 illustrates a cable made in accordance with this invention, a portion of the cable having been frayed out to reveal its construction; Fig. 2 illustrates a simplified form of the same construction; and Fig. 3 illustrates an alternative structure or modification of the present invention.

In the construction illustrated in Fig. 1, a conductor 1 is surrounded by a series of insulating paper tapes 2 which have been previously impregnated with an oil of good dielectric characteristics. As stated above, the chief purpose of this invention is to prevent this oil from exuding out and coating the surfaces of the metal sheath 4 during the soldering of the same together  One method of accomplishing this result is to employ a layer of barrier material 3 which is impervious to such oil.  Preferably barrier material 3 is comprised of cellulosic material known in the art as regenerated cellulose, and more generally as "Cellophane". This material in relatively thin sections is relatively impermeable to oil and similar compositions utilized for impregnating tapes 2. As indicated in Fig. 1 barrier material 3 may be comprised of a plurality of overlying tapes of such cellulosic material forming a sheath.

Alternatively as indicated in Fig. 3 this barrier material may be deposited on the cable and insulating wrapping as a relatively thin film or layer as by dipping, spraying, etc. The thickness of the barrier material 3 may vary widely without departing essentially from the present invention, depending upon the nature of the same. Its function is to prevent the composition with which tapes 2 have been impregnated from exuding between the overlapping copper strips 4 during the time interval required to heat the same and to solder them together in a fluid-tight sheath. Thereafter the material 3 may become impregnated with the oil by absorption without deleterious results.

I have found it preferable to interpose a soft layer of material 5 between the metal sheath 4 and material 3 so that the copper strips comprising the same may be applied to the insulating wrappings under a considerable tension without cutting or cracking the layers beneath. Material 5 is preferably made from crumpled paper formed in strips or tapes and wound on the cable in the usual manner The most practical method of soldering the copper strips comprising sheath 4 is to tin the strips before they are wrapped about the cable in overlapping relationship so that the overlapping edges will be united upon the application of heat thereto.

Since it is only necessary that the barrier layer 3 prevent the migration of the oil during the interval between the application of the barrier material and the soldering of the copper strips to form sheath 4, I have found that a layer of soft unimpregnated paper alone will in many cases delay the penetration of the oil until the operation of soldering has been completed. Such a construction is shown in Fig. 2 in which the layers over the conductor 1 are respectively oil impregnated paper 2, soft paper 5 and the copper sheath 4. As shown in Fig. 2 it is possible to corrugate the outer sheath as at 6 to increase flexibility of the construction. In practice it has been found that the inclusion of a relatively soft layer of material 5 has a further advantage in that it becomes possible to smooth the outside of the copper sheath by passing through an ironing die, all irregularities being taken up by the soft paper layer. The characteristics of the cable structure hereinabove described are further improved where the relatively soft layer of material 5 which is interposed between metal sheath 4 and impregnated wrapping 3, is comprised of carbon black paper. Carbon black paper when so used performs the dual function of protecting the barrier sheath 3 and of providing an electrical shield for the cable.

In the above construction the insulating layers of paper are hermetically sealed in the enclosing sheath inasmuch as the successive overlapping coils of the strip 4 are joined by fusion, soldering or welding.

While a preferred embodiment of the invention has been described and illustrated it is understood that many modifications may be made particularly as to the materials employed without departing from the invention as may be included in the following claim.

What I claim is:

The method of preventing the impregnating composition of insulating wrappings about a cable core from exuding through the overlap portions of an outer metallic spiral sheath while heating the said sheath during soldering said overlap portions together, which comprises enclosing said wrappings and core in a fluid-tight sheath before the application of said outer metallic sheath and thereafter soldering the overlap portions of said metallic sheath while the fluid-tight sheath retains the impregnating composition in the wrapping.

FRANK L. AIME.